United States Patent
Svilans

(10) Patent No.: US 9,618,698 B2
(45) Date of Patent: Apr. 11, 2017

(54) OPTICAL WAVEGUIDE CROSSINGS

(71) Applicant: Huawei Technologies Co., Ltd., Shenzhen (CN)

(72) Inventor: Mikelis Svilans, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 44 days.

(21) Appl. No.: 14/535,091

(22) Filed: Nov. 6, 2014

(65) Prior Publication Data
US 2016/0131848 A1    May 12, 2016

(51) Int. Cl.
*G02B 6/12*    (2006.01)
*G02B 6/125*   (2006.01)
*G02B 6/293*   (2006.01)

(52) U.S. Cl.
CPC ......... *G02B 6/125* (2013.01); *G02B 6/12004* (2013.01); *G02B 6/29316* (2013.01)

(58) Field of Classification Search
None
See application file for complete search history.

(56) References Cited

U.S. PATENT DOCUMENTS

| | | | | |
|---|---|---|---|---|
| 5,500,734 A * | 3/1996 | Spanner | ................... | G01D 5/38 250/237 G |
| 5,602,863 A * | 2/1997 | Itagaki | ................. | G02B 6/4249 257/82 |
| 5,648,978 A * | 7/1997 | Sakata | ................... | B82Y 20/00 372/27 |
| 6,275,628 B1 * | 8/2001 | Jones | ................. | G02B 6/02057 385/29 |
| 7,162,124 B1 | 1/2007 | Gunn, III et al. | | |
| 7,388,894 B2 * | 6/2008 | O'Daniel | .............. | H01S 5/1082 372/32 |
| 8,263,928 B1 * | 9/2012 | Efimov | ................... | G02F 1/011 250/227.11 |
| 8,267,583 B2 * | 9/2012 | Yao | .......................... | G02B 6/13 384/31 |
| 8,929,693 B2 * | 1/2015 | Shin | ........................ | G02B 6/12 385/123 |

(Continued)

FOREIGN PATENT DOCUMENTS

CN    101248379 A    8/2008
WO    2014021813 A1   2/2014

OTHER PUBLICATIONS

Krishnamoorthy, A. V. et al., "Progress in Low-Power Switched Optical Interconnects," IEEE Journal of Selected Topics in Quantum Electronics, vol. 17, Issue 2, Mar.-Apr. 2011, pp. 357-376.

(Continued)

*Primary Examiner* — Tina Wong
(74) *Attorney, Agent, or Firm* — Slater Matsil, LLP

(57) ABSTRACT

System, apparatus, and method embodiments are provided for optical waveguide crossings. In an embodiment, a system for transmitting an optical signal across an optical obstruction includes a first optical waveguide optically coupled to a first surface grating coupler (SGC); a second optical waveguide optically coupled to a second SGC; and a reflector configured to reflect an optical signal from the first SGC to the second SGC.

32 Claims, 10 Drawing Sheets

(56) References Cited

U.S. PATENT DOCUMENTS

| | | | |
|---|---|---|---|
| 2002/0067540 A1* | 6/2002 | Delprat | H01S 5/50 359/344 |
| 2005/0213873 A1 | 9/2005 | Piede et al. | |
| 2011/0150024 A1* | 6/2011 | Dupont | H01S 5/1032 372/50.11 |
| 2012/0177077 A1* | 7/2012 | Erbert | H01S 5/1064 372/50.11 |
| 2012/0320939 A1* | 12/2012 | Baets | B82Y 20/00 372/45.01 |
| 2013/0022316 A1 | 1/2013 | Pelletier et al. | |
| 2013/0108208 A1 | 5/2013 | Doerr | |
| 2014/0153600 A1* | 6/2014 | Luo | B82Y 20/00 372/40 |
| 2015/0168647 A1* | 6/2015 | Liang | B82Y 20/00 385/14 |

OTHER PUBLICATIONS

Yao, J. et al., "Grating-Coupler Based Low-Loss Optical Interlayer Coupling," 8th Annual IEEE International Conference on Group IV Photonics (GFP), Sep. 14-16, 2011, pp. 383-385.

* cited by examiner

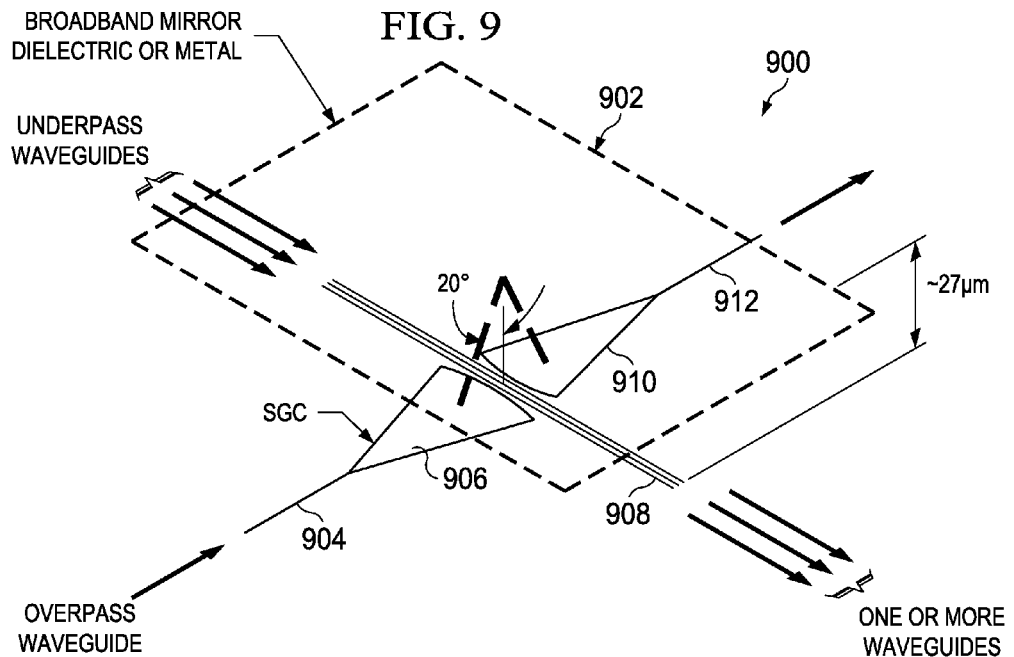
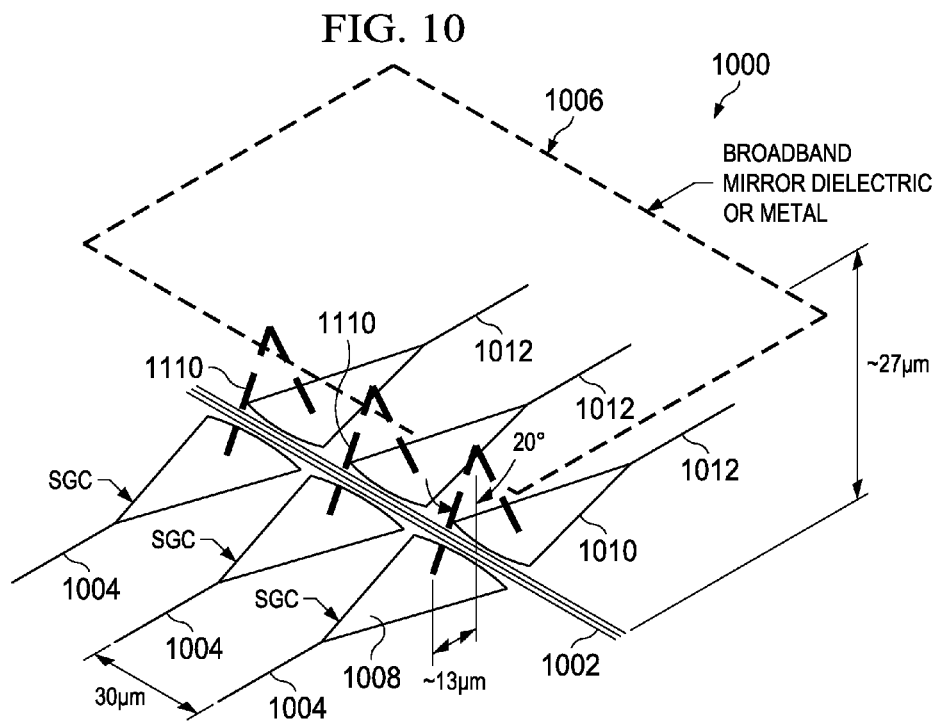

OPTICAL WAVEGUIDE CROSSINGS

TECHNICAL FIELD

The present invention relates to an optical transmission system, and, in particular embodiments, to systems and apparatuses for optical waveguide crossings.

BACKGROUND

Photonic integrated circuit (PIC) technology is expected to play an increasingly important role in optical communications, imaging, computing, and sensing with the promise for significant reduction in cost and weight of these systems. Future advancement of this technology may be significantly dependent on the ability to develop better scalability, testability, high performance, and cost effectiveness for this technology.

Optical switches on PICs contain many cells which need to be optically interconnected. Switch topology requires a large number of optical channel crossings (or bridges) including intra-chip (over waveguides or other photonic elements) and inter-chip (over gaps between chips). Optical switches on PICs use surface grating couplers for optical input and output ports. The optical input and output ports are generally coupled to optical fibers and may be used for coupling to other PICs.

Existing waveguide crossing or optical channel crossing including same level waveguide crossing, crystallographically oriented mirror systems, and surface grating couplers for inter-chip optical connection. FIG. 1 shows a diagram of a same level waveguide crossing 100. Although the same level waveguide crossing 100 provides optical channel crossing, it cannot be used over trenches nor over gaps between chips.

FIG. 2 shows a schematic diagram of a crystallographically oriented mirror system 200 for waveguide crossing. System 200 includes two waveguides 202, 204, separated by a gap 206. Each waveguide 202, 204 includes an angled mirror 208, 210 to reflect light from waveguide 202 to waveguide 204. However, system 200 is constrained to fixed wafer crystallographic axes. Furthermore, AR coatings are necessary on the vertical facets 209, 211. However, coating on vertical and angled facets is technologically complex.

FIGS. 3A and 3B are diagrams illustrating a system 300 for surface grating couplers for inter-chip optical connection. System 300 includes an input waveguide 302, an input surface grating coupler (SGC) 304, an output SGC 306, and an output waveguide 308. One problem with this type of inter-chip optical connection is the problem of aligning inverted grating images.

SUMMARY

In accordance with an embodiment, a system for transmitting an optical signal across an optical obstruction includes a first optical waveguide optically coupled to a first surface grating coupler (SGC); a second optical waveguide optically coupled to a second SGC; and a reflector configured to reflect an optical signal from the first SGC to the second SGC.

In accordance with an embodiment, a network component configured for transmitting and receiving optical signals includes a photonic integrated circuit (PIC), wherein the PIC includes a first optical waveguide optically coupled to a first surface grating coupler (SGC); a second optical waveguide optically coupled to a second SGC; and a reflector configured to reflect an optical signal from the first SGC to the second SGC.

In accordance with an embodiment, a method for transmitting an optical signal across an optical obstruction in an photonic integrated circuit (PIC) includes propagating an optical signal through a first optical waveguide to a first surface grating coupler (SGC) optically coupled to the first optical waveguide; reflecting the optical signal received from the first SGC to an second SGC; and propagating the optical signal received at the second SGC through a second optical waveguide optically coupled to the second SGC.

BRIEF DESCRIPTION OF THE DRAWINGS

For a more complete understanding of the present invention, and the advantages thereof, reference is now made to the following descriptions taken in conjunction with the accompanying drawing, in which:

FIG. 9 is a diagram illustrating an isometric view of an embodiment of a single waveguide bridge;

FIG. 10 is a diagram illustrating an isometric view of an embodiment of a multiple waveguide bridge system.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Disclosed herein are embodiments about systems and apparatuses for waveguide crossings on PICs. In an embodiment, a reflector is used in conjunction with a pair of surface grating couplers (SGCs). One SGC is placed on one side of a feature (e.g., waveguide) to be crossed and a second SGC is placed on the other side of the feature to be crossed. An optical signal propagating along a waveguide crosses a feature (e.g., a barrier to optical propagation) by launching into free space from the first SCG, being reflected by a reflector positioned above the feature to be crossed into the second SGC, and focusing the reflected optical signal into a waveguide on the other side of the feature to be crossed.

Figure 1:
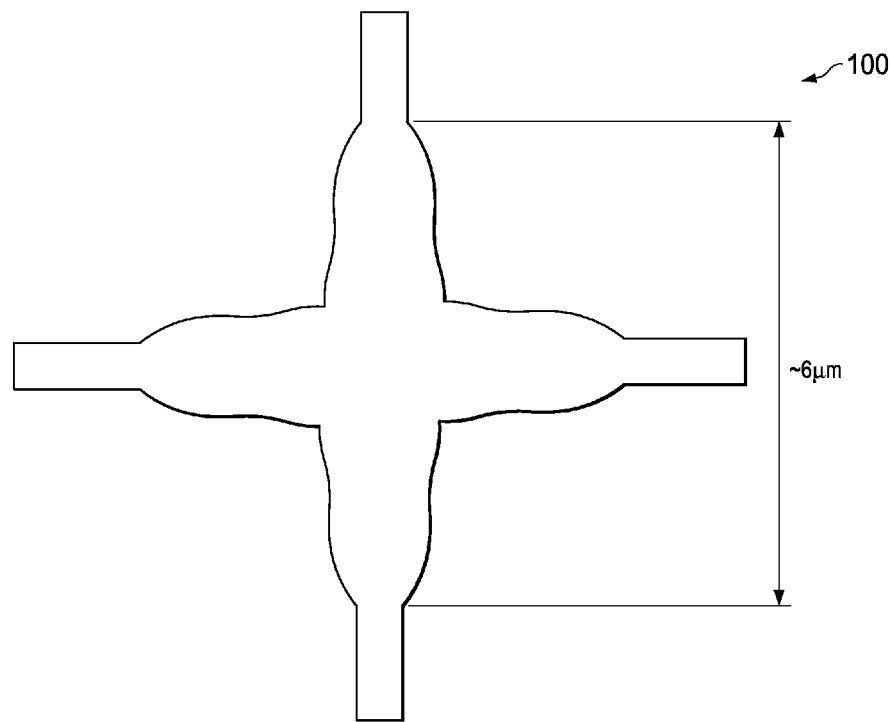
FIG. 1 shows a diagram of a prior art same level waveguide crossing.
Figure 2:
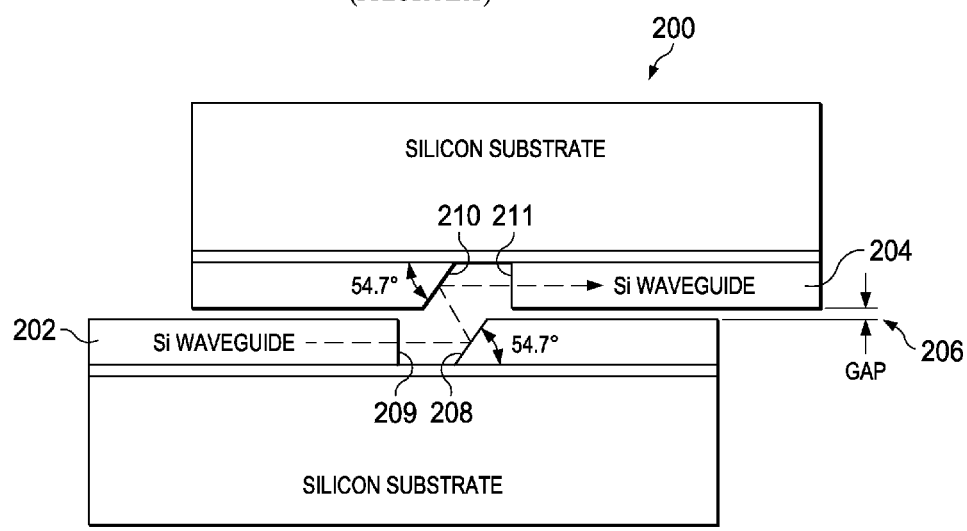
FIG. 2 shows a schematic diagram of a prior art crystallographically oriented minor system for waveguide crossing.
Figure 3A:
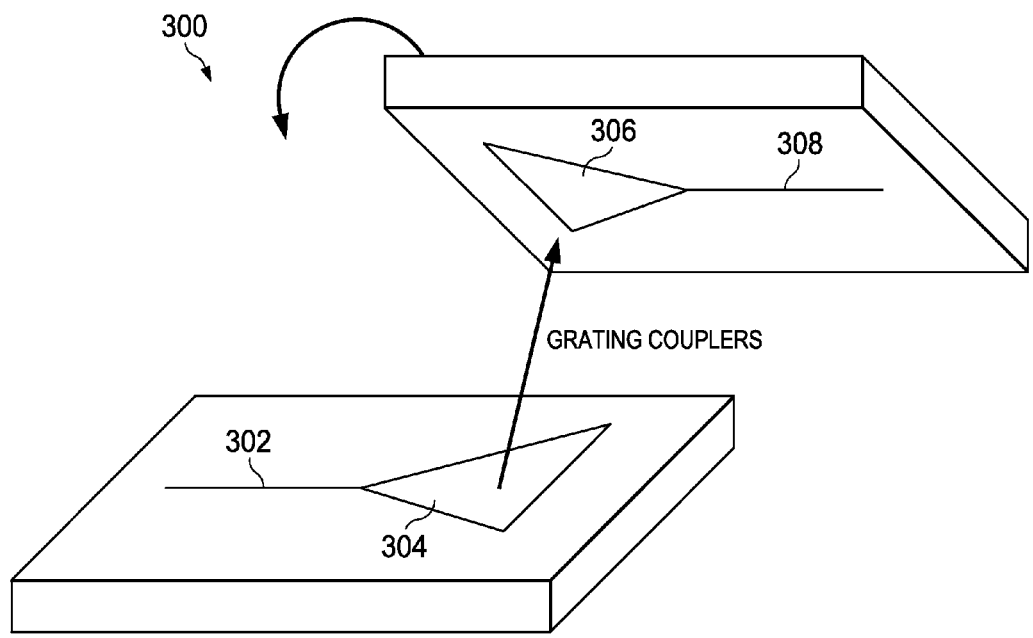
FIGS. 3A and 3B are diagrams illustrating prior art surface grating couplers for inter-chip optical connection.
Figure 3B:
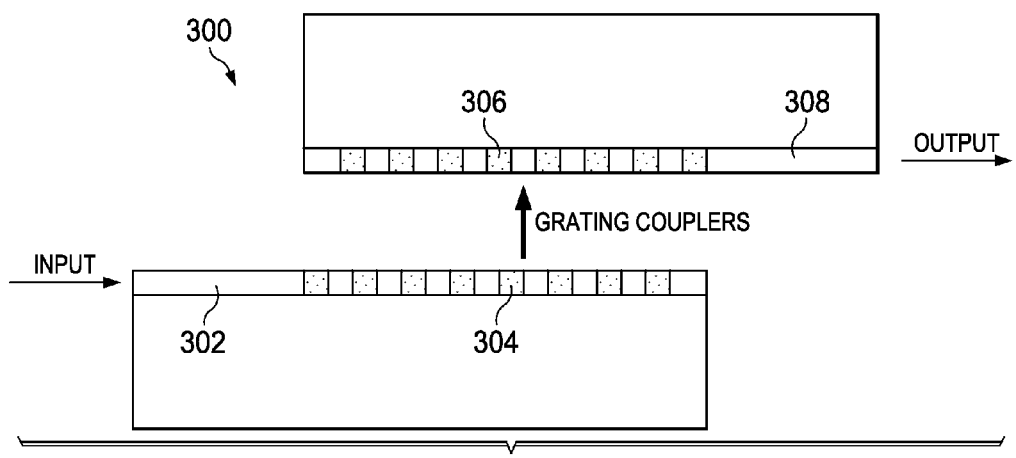
Figure 4:
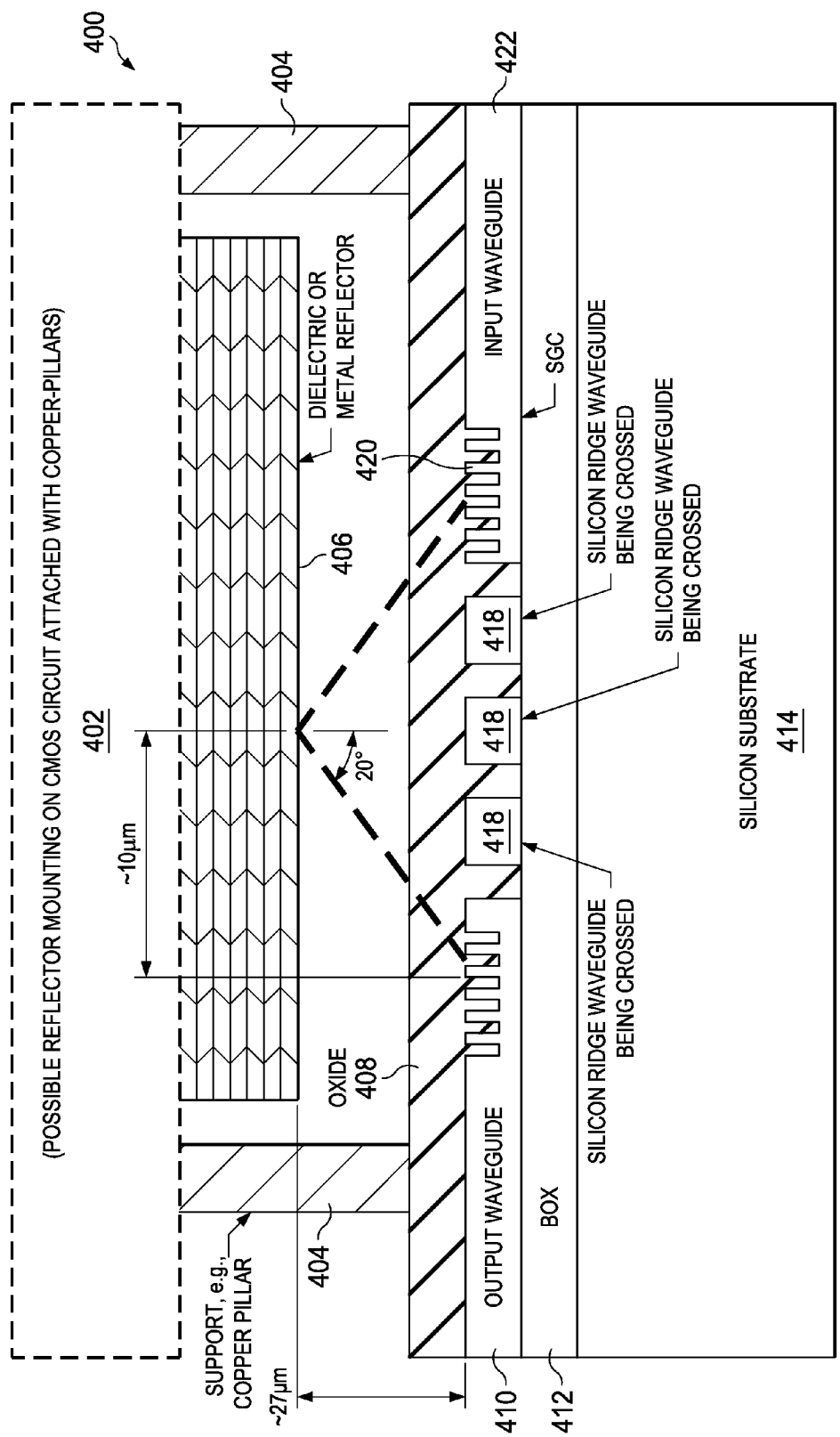
FIG. 4 is a cross-section diagram of an embodiment of an intra-chip waveguide bridge.

FIG. 4 is a cross-section diagram of an embodiment intra-chip waveguide bridge 400. Waveguide bridge 400 includes a silicon substrate 414, an output waveguide 410, an input waveguide 422, an output surface grating coupler (SGC) 416, an input SGC 420, an oxide layer 408, a buried oxide layer (BOX) 412, a feature 418 to be crossed, a reflector 406, reflector supporting pillars 404, and reflector mounting structure 402. In an embodiment, a silicon oxide layer 408 covers the output waveguide 410, input waveguide 422, and feature 418. The output waveguide 410, input waveguide 422, and feature 418 are disposed on the BOX 412 over the silicon substrate 414. In an embodiment, the feature 418 is a set of silicon ridge waveguides. Optical signals propagating through output waveguide 410 crosses the feature 418 by launching into free space from the output SGC 416, reflecting off of reflector 406 into the input SGC 420, and focusing into the input waveguide 422 on the other side. In an embodiment, the distance between the center of the feature 418 to be crossed and the center of the output SGC 416 or the center of the input SGC 422 is about 10 microns and the angle of incidence from perpendicular of the optical signal reflecting from the reflector 406 is about 20 degrees. This distance and angle may vary in other embodiments. In an embodiment, the distance between the reflector and the top of the output SGC 416 or the input SGC 420 is about 27 microns. This distance may be different in other embodiments.

In an embodiment, the reflector 406 is a specular reflector comprising a dielectric minor, such as, for example, a dielectric interference filter. In another embodiment, the reflector 406 is a specular reflector comprising a metal mirror, such as, for example, copper, silver, gold, etc., or an alloy. In another embodiment, the reflector 406 is a diffraction grating. In use, the output waveguide 410 may carry several optical signals; each may at a different wavelength. To transfer all of the optical signals from the output waveguide 410 to the input waveguide 422, in an embodiment a broadband reflector is preferably selected for the reflector 406, such as, for example, a specular high-reflectivity dielectric minor or a specular metal minor. To transfer a subset of the optical signals from the output waveguide 410 to the input waveguide 422, in an embodiment a wavelength selective reflector is preferably selected for the reflector 406, such as, for example, an appropriately designed dielectric minor or a diffraction grating. The supports 404 are copper pillars in one embodiment. Other materials can be used for the supports 404 in other embodiments. The reflector 406 is mounted beneath a reflector mounting 402 in an embodiment. In other embodiments, the reflector is attached directly to the supports 404. The reflector mounting 402 is a Complementary Metal-Oxide-Semiconductor (CMOS) circuit or other circuit in some embodiments. In an embodiment, the silicon substrate 414 is a compound semiconductor.

Figure 5:
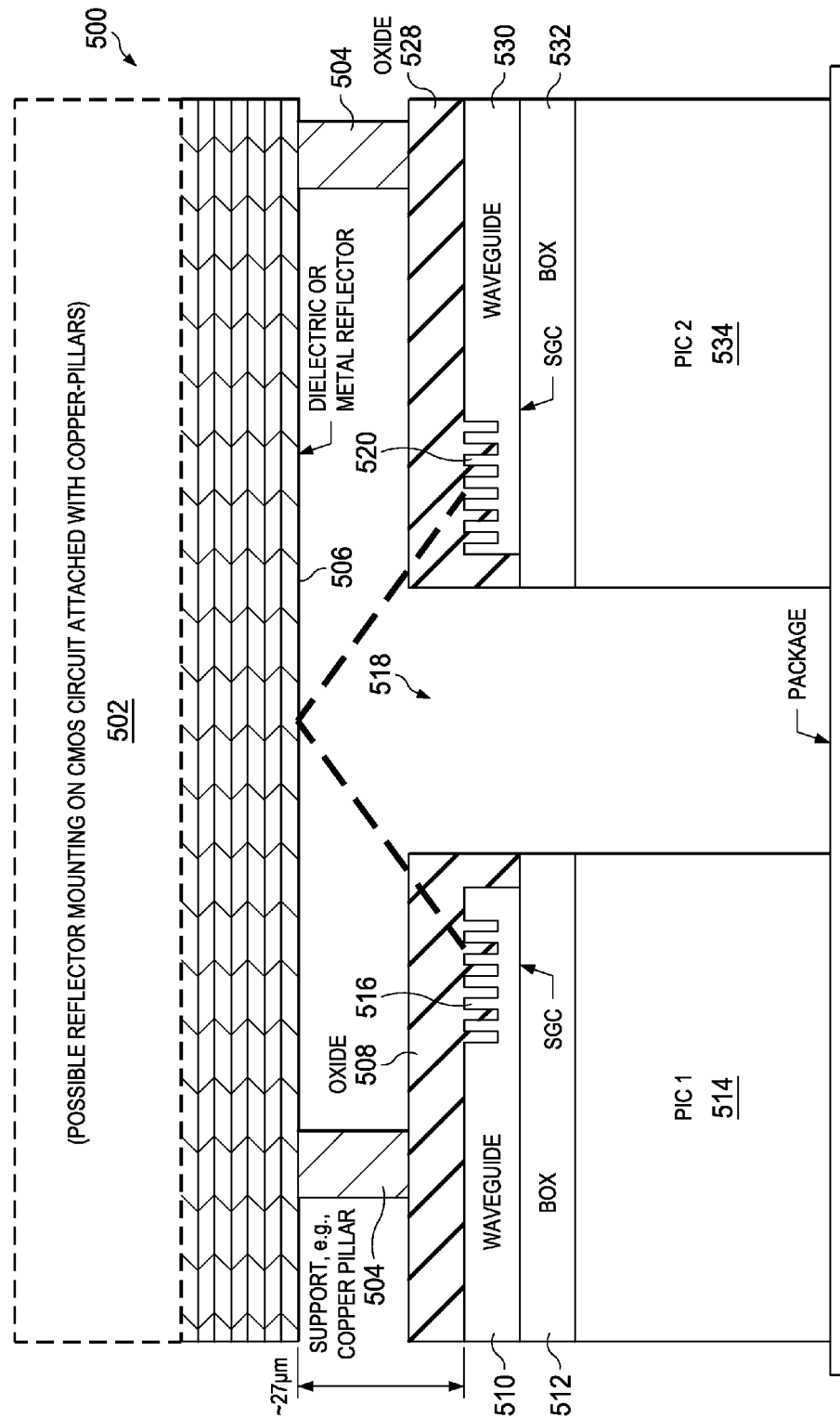
FIG. 5 is a cross-section diagram of an embodiment waveguide bridge between 2 separate Si PICs.

FIG. 5 is a cross-section diagram of an embodiment waveguide bridge 500. Waveguide bridge 500 is similar to waveguide bridge 400 in FIG. 4. Waveguide bridge 500 includes a first PIC (PIC1 1) and a second PIC (PIC 2) resting on a package 522 with a gap 518 between the first and second PICs. PIC 1 includes an oxide layer 508, an input waveguide 510, an output SGC 516, a buried oxide layer (BOX) 512, and a substrate 514 (e.g., a silicon substrate). Similarly, PIC 2 includes an oxide layer 528, an output waveguide 530, an input SGC 520, a buried oxide layer (BOX) 532, and a substrate 534. A reflector 506 is supported above the two SGCs 516, 520 by support pillars 504. Each support pillar 504 rests on the oxide layer 508, 528 of one of PIC 1 or PIC 2. The reflector 506 is similar to reflector 406 in FIG. 4. In an embodiment, the reflector 506 includes a dielectric, a metal, or an alloy. In an embodiment, the reflector 506 is mounted to the underside of a reflector mounting 502. In an embodiment, the reflector mounting 502 is a CMOS circuit or other circuit. Optical signals propagating through input waveguide 510 crosses the gap 518 by launching into free space from the output SGC 516, reflecting off of reflector 506 into the input SGC 520, and focusing into the output waveguide 530 on the other side.

Figure 6:
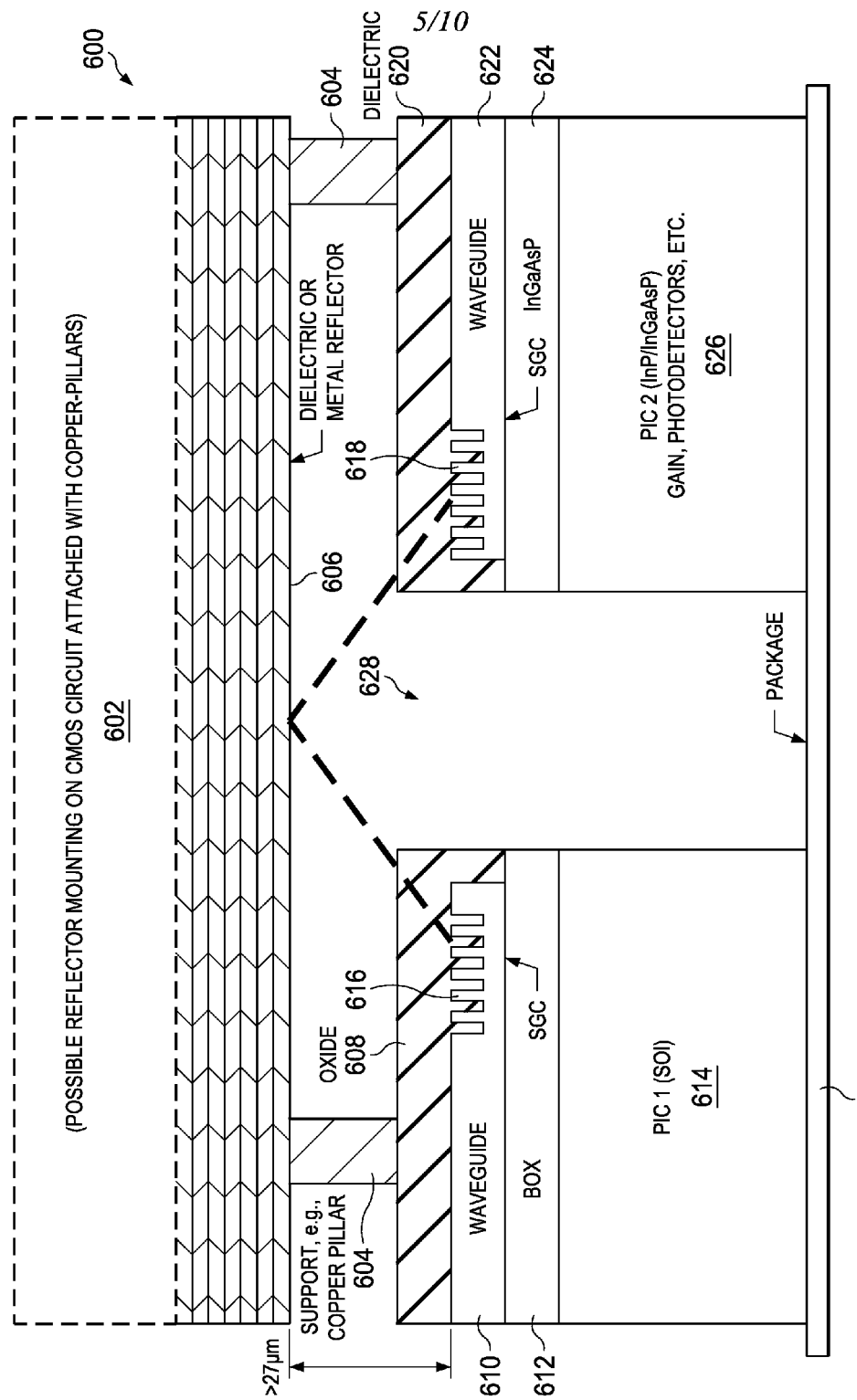
FIG. 6 is a cross-section diagram of an embodiment waveguide bridge between a Si PIC and an InP PIC.

FIG. 6 is a cross-section diagram of an embodiment waveguide bridge 600. Waveguide bridge 600 is similar to waveguide bridge 500 in FIG. 5. Waveguide bridge 600 includes two PICs resting on a package 630 separated by a gap 628. The first PIC (PIC 1) is similar to PIC 1 in FIG. 5. The first PIC includes an oxide layer 608, an input waveguide 610, a buried oxide layer (BOX) 612 and a substrate 614 (e.g., silicon-on-insulator (SOI)). However, the second PIC (PIC 2) is a different type of PIC from PIC 1 (rather than the same type as in FIG. 5). PIC 2 includes a dielectric layer 620, an input waveguide 622, and an output SGC 618 all resting on an Indium Gallium Arsenide Phosphide (InGaAsP) layer 624 which is deposited on an Indium Phosphide (InP)/InGaAsP substrate. The PIC 2 may provide gain, photodetectors, etc. Supports 604 support the reflector 606 above the PICs and gap 628. The reflector 606 may be mounted under a reflector mount 602. Optical signals propagating through input waveguide 610 crosses the gap 628 by launching into free space from the output SGC 616, reflecting off of reflector 606 into the input SGC 618, and focusing into the output waveguide 622 on the other side.

Figure 7:
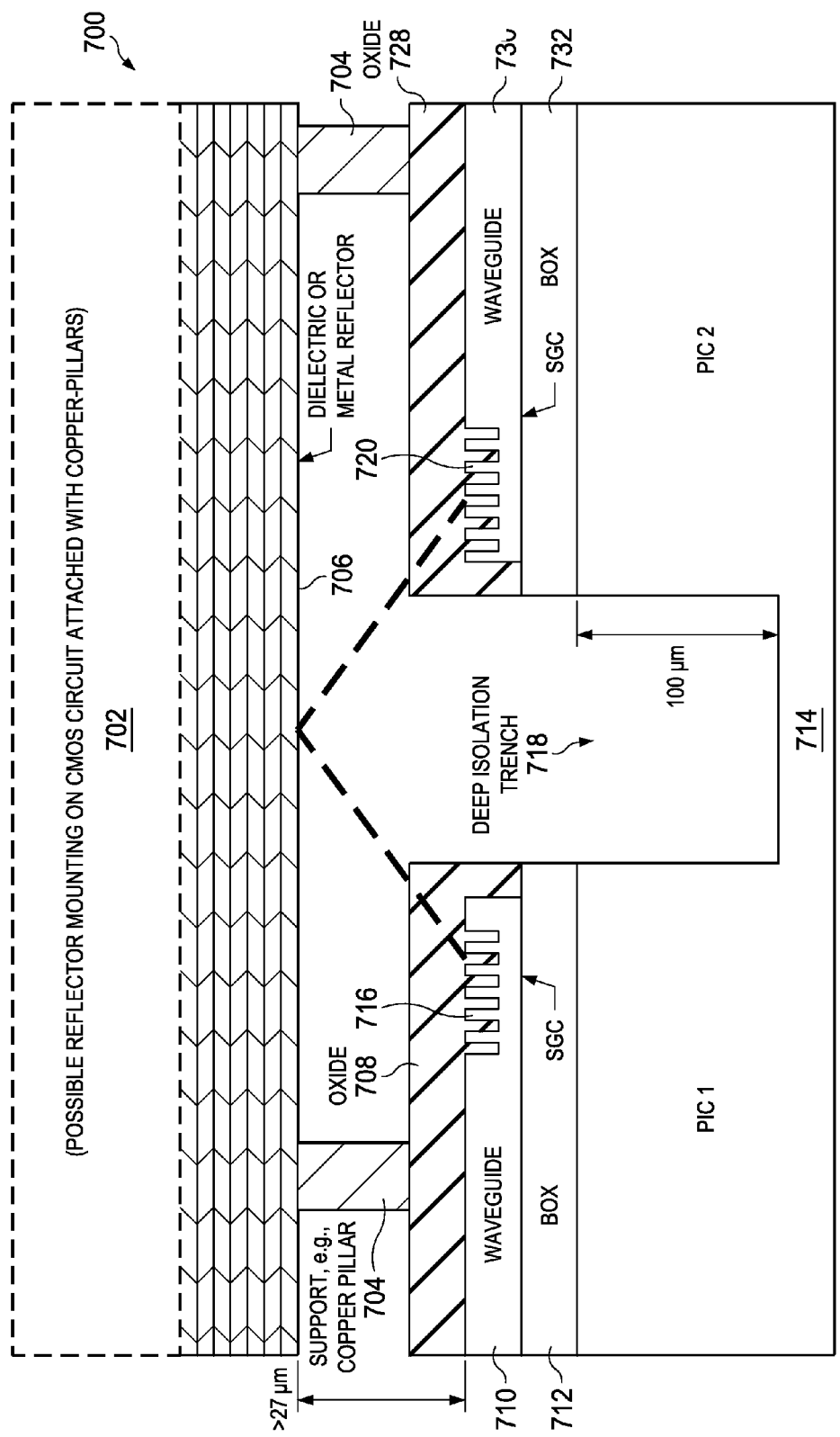
FIG. 7 is a cross-section diagram of an embodiment of an intra-chip waveguide bridge over a trench.

FIG. 7 is a cross-section diagram of an embodiment waveguide bridge 700. Waveguide bridge 700 is similar to waveguide bridge 500 in FIG. 5. Waveguide bridge 500 includes two PICs (PIC 1 and PIC 2) separated by a deep isolation trench 718. PIC 1 includes an oxide layer 708, an input waveguide 710, an output SGC 716, and a buried oxide layer (BOX) 712 sitting on a substrate 714. PIC 2 includes an oxide layer 728, an input waveguide 730, an output SGC 720, and a buried oxide layer (BOX) 732 sitting on the substrate 714. The reflector 706 is supported above the PICs and deep isolation trench 718 by support pillars 704 and may be mounted beneath a reflector mounting 702 that may include other electrical or optical circuitry and/or components providing additional functionality. Optical signals propagating through input waveguide 710 crosses the deep isolation trench 718 by launching into free space from the output SGC 716, reflecting off of reflector 706 into the output SGC 720, and focusing into the input waveguide 730 on the other side. In an embodiment, the deep isolation trench 718 is about 100 microns in depth.

Figure 8:
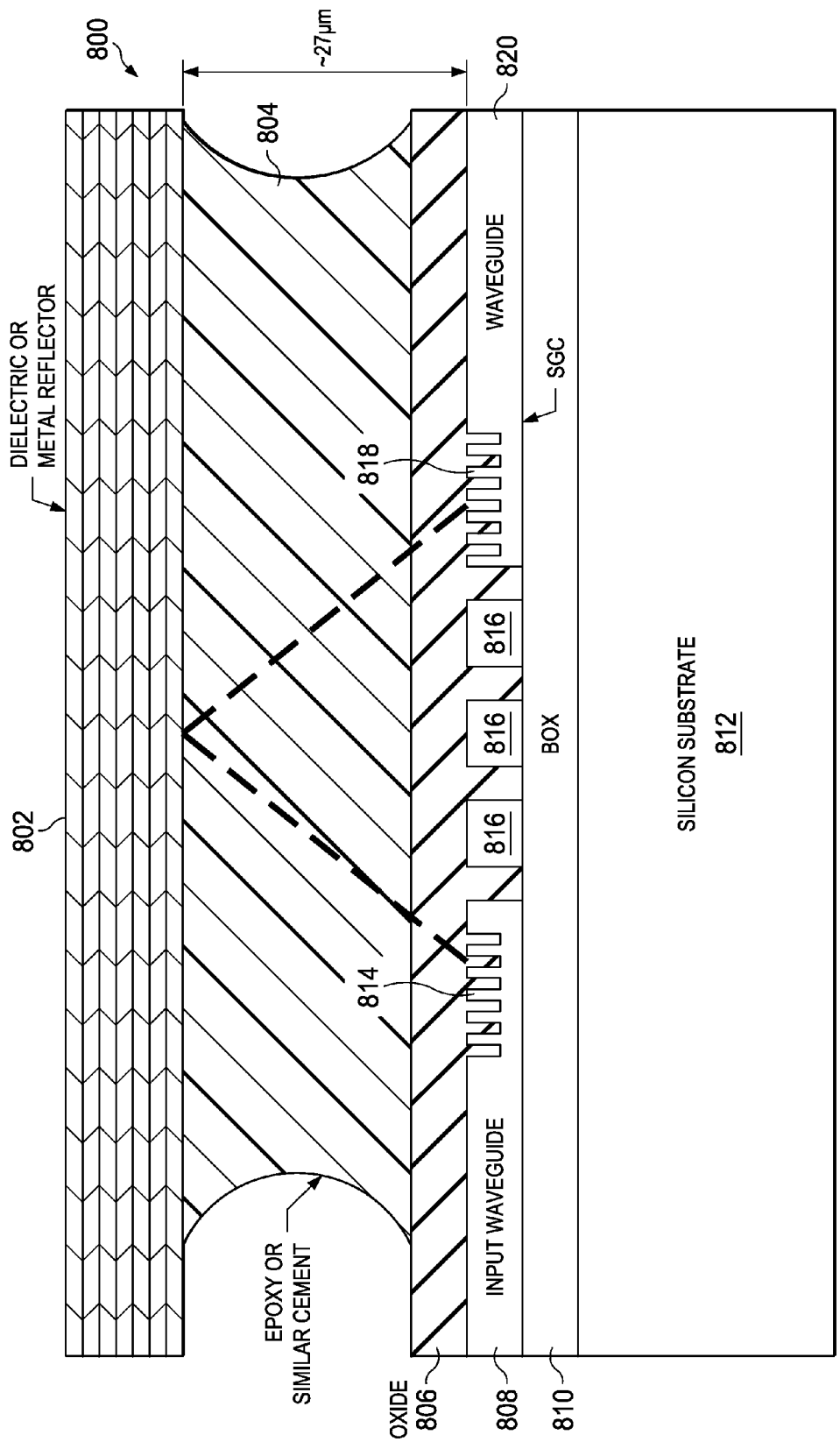
FIG. 8 is a cross-section diagram of an embodiment of a waveguide bridge using epoxy for mounting the reflector into place.

FIG. 8 is a cross-section diagram of an embodiment waveguide bridge 800. Waveguide bridge 800 is similar to waveguide bridge 400 in FIG. 4. Waveguide bridge 800 includes a silicon substrate 812, an input waveguide 808, an output waveguide 820, an output SGC 814, an input SGC 818, an oxide layer 806, a buried oxide layer (BOX) 810, a feature 816 to be crossed, a reflector 802, and a reflector support 804. The reflector support 804 is deposited onto the oxide layer 806 and the reflector 802 is deposited onto or otherwise physically connected to the reflector support 804. In an embodiment, the reflector support 804 is an epoxy or similar cement that is substantially transparent to optical frequencies in the range of those propagated through the waveguides 808, 820. In an embodiment, a silicon oxide layer 806 covers the input waveguide 808, output waveguide 820, and feature 816. The input waveguide 808, output waveguide 820, and features 816 sit upon a buried oxide layer (BOX) 810 over the silicon substrate 812. In an embodiment, the features 816 are silicon ridge waveguides. The features 816 may be other barriers to optical propagation along the waveguides 808, 820 in other embodiments. Optical signals propagating through input waveguide 808 crosses the feature 816 by launching into free space from the output SGC 814, reflecting off of reflector 802 into the input SGC 818, and focusing into the output waveguide 820 on the other side of the feature 816 to be crossed.

FIG. 9 is a diagram illustrating an isometric view of an embodiment waveguide bridge 900. Waveguide bridge 900 includes a reflector 902 situated over an input waveguide 904, an input SGC 906, an output SGC 910, an output waveguide 912, and one or more waveguides 908 that separate the input waveguide 904 from the output waveguide 912. In an embodiment, the reflector 902 is about 27 microns from the surface of the SGCs 906, 910. In an embodiment, the reflector 902 is a broadband mirror. In an embodiment, the reflector 902 is a dielectric or a metal (including pure metals and alloys). Optical signals propagating through input waveguide 904 cross the waveguides 908 by launching into free space from the output SGC 906, reflecting off the reflector 902 into the input SGC 910, and focusing into the output waveguide 912 on the other side of the one or more waveguides 908.

FIG. 10 is a diagram illustrating an isometric view of an embodiment waveguide bridge system 1000. FIG. 10 illustrates a system in which multiple waveguide bridges are utilized. System 1000 includes a plurality of side one waveguides 1004 and a plurality of side two waveguides 1012 as well as a plurality of side one SGCs 1008 and a plurality of side two SGCs 1010. Side one and side two components are separated by one or more underpass waveguides 1002. System 1000 also includes a reflector 1006 that reflects multiple optical signals 1110 propagating from waveguides on one side of the underpass waveguides 1002 to waveguides on the other side of the underpass waveguides 1002. In an embodiment, the reflector 1006 is a broadband minor. In an embodiment, the reflector 1006 is a wavelength selective minor. In an embodiment, the reflector 1006 is a dielectric or a metal. In an embodiment, the distance between adjacent side one waveguides 1004 or between adjacent side two waveguides 1012 is about 30 microns. Some of the side one waveguides 1004 may be input waveguides and some may be output waveguides. Similarly, some of the side two waveguides 1012 may be input waveguides and some may be output waveguides. In an embodiment, the SGCs 1008, 1010 are about 25 microns long in the direction of propagation of the optical signals.

Figure 11:
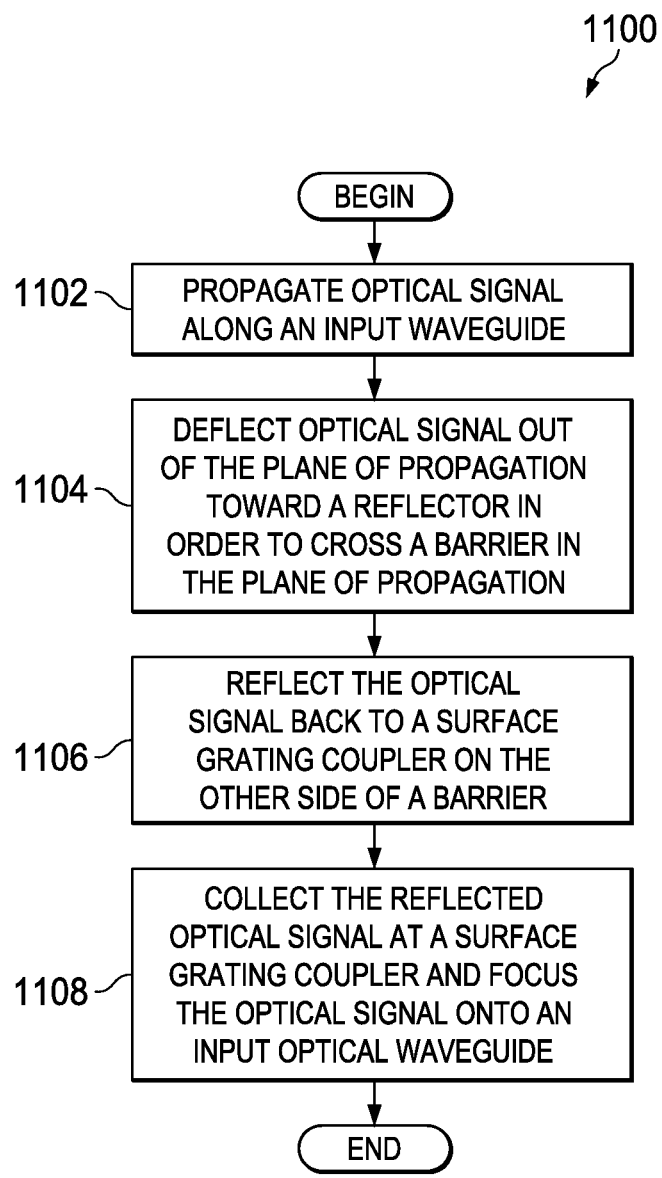
FIG. 11 is a block diagram of a method of using a waveguide bridge.

FIG. 11 is a flowchart illustrating an embodiment method 1100 for propagating an optical signal across an optical barrier in an optical chip. Method 1100 may be implemented in any of waveguide bridges 400, 500, 600, 700, 800, 900 or system 1000. Method 1100 at block 1102 where an optical signal is propagated along an input waveguide. At block 1104, an SGC coupled to the input waveguide deflects the optical signal out of the plane of propagation toward a reflector in order to cross a barrier in the plane of propagation. At block 1106, a reflector reflects the optical signal back to an SGC on the other side of the barrier. The reflector can be a dielectric or a metal. In an embodiment, the reflector is a broadband minor. In an embodiment, the reflector is a waveguide selective minor. At block 1108, the reflected optical signal is collected at an SGC and focused onto an input optical waveguide to continue propagation, after which, the method 1100 ends.

Figure 12:
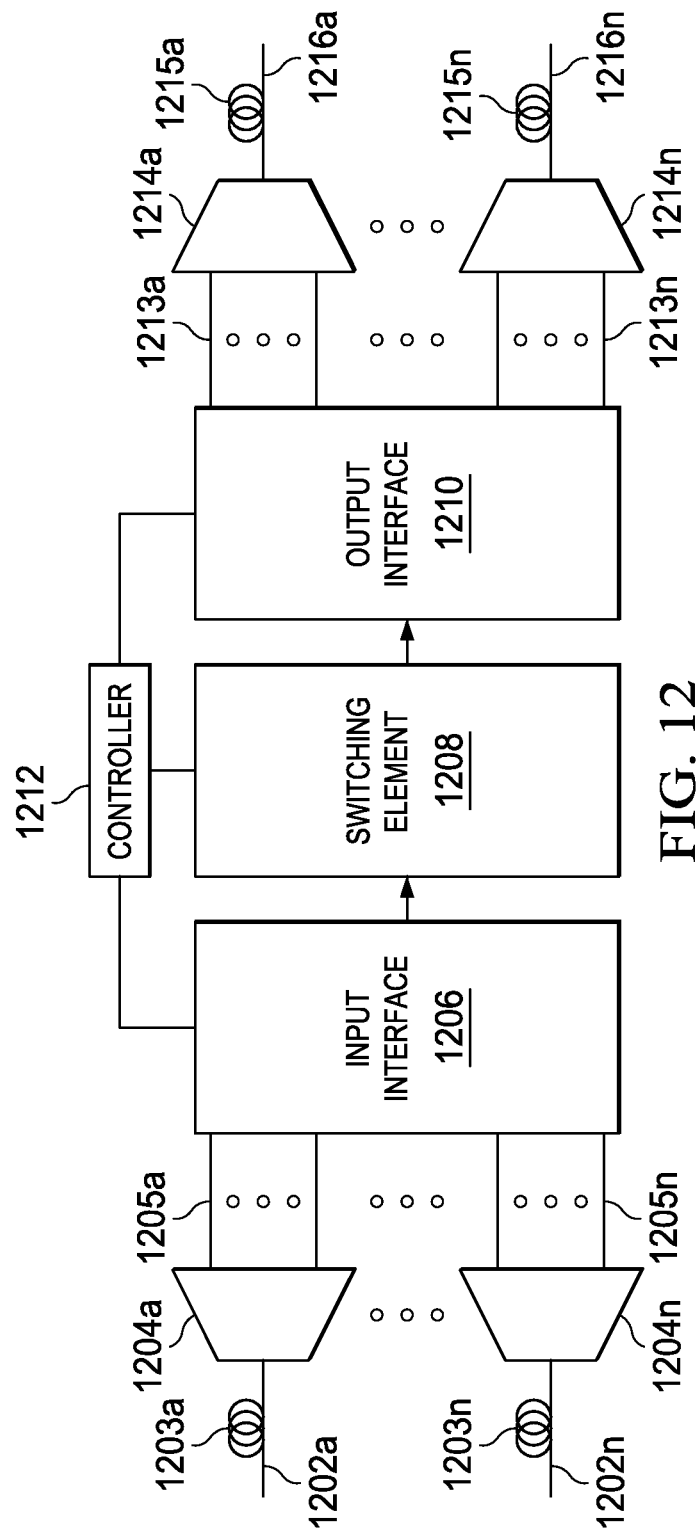
FIG. 12 is a block diagram of an embodiment optical data router.

FIG. 12 is a block diagram of an embodiment optical data router 1200. Optical data router 1200 may be used for implementing the devices and methods disclosed herein. Specific devices may utilize all of the components shown, or only a subset of the components and levels of integration may vary from device to device. Furthermore, a device may contain multiple instances of a component. Router 1200 includes one or more separators 1204, an input interface 1206, a switching element 1208, an output interface 1210, a controller 1212, and one or more combiners 1214. Each separator 1204 is configured to separate an input optical signal 1203 communicated over a communication link 1202. Separator 1204 may comprise, for example, a wavelength division demultiplexer. As used throughout this document, the phrases "wavelength division multiplexer" and "wavelength division demultiplexer" may include any optical and/or electrical components—including any hardware, software, and/or firmware—capable of processing wavelength division multiplexed signals and/or dense wavelength division multiplexed signals. In an embodiment, the input interface 1206, switching element 1208, and/or output interface 1210 include a PIC that incorporates the disclosed thermo-optic switches with thermally isolated and heat restricting pillars.

Communication link 1202 may include, for example, standard single mode fiber (SMF), dispersion-shifted fiber (DSF), non-zero dispersion-shifted fiber (NZDSF), dispersion compensating fiber (DCF), or another fiber type or combination of fiber types. In some embodiments, communication link 1202 is configured to couple router 1200 to other optical and/or electro-optical components. For example, link 1202 could couple router 1200 to a cross-connect or another device operable to terminate, switch, route, process, and/or provide access to and/or from communication link 1202 and another communication link or communication device. As used throughout this document, the term "couple" and or "coupled" refers to any direct or indirect communication between two or more elements, whether or not those elements are physically connected to one another. In some embodiments, communication link 1202 can comprise a point-to-point communication link or a portion of a larger communication network, such as a ring network, a mesh network, a star network, or other network configuration.

Optical signal 1203 may include a multiple wavelength optical signal. For example, optical signal 1203 can include at least 5 wavelength channels, at least 100 wavelength channels, or at least 250 wavelength channels. In one particular embodiment, optical signal 1203 includes 250 wavelengths having a 50 gigahertz (GHz) spacing within a 100 nanometer (nm) spectral window. In that example, the 100 nm spectral window can be located within the 1400 nm to 1650 nm low-loss window associated with optical fibers. In various embodiments, optical signal 1203 can implement one or more data formats, such as, polarization shift keying (PLSK), pulse position modulation (PPM), Multi-Protocol Label Swapping (MPLS), Generalized Multi-Protocol Label Swapping (GMPLS), non-return to zero (NRZ), return to zero (RZ), differential phase shift key (DPSK), or a combination of these or other format types.

In an embodiment, separator 1204 is configured or operates to separate optical signal 1203 into individual wavelength channels 1205 and to couple each wavelength channel 1205 to an input interface 1206. In an alternative embodiment, separator 1204 can separate optical signal 1203 into separate multiple-wavelength channels and couple those multiple-wavelength channels to input interface 1206. Wavelength channels 1205 can comprise, for example, Internet Protocol (IP) packets, voice data, video data, or any other data type and/or data format. In this particular embodiment, each wavelength channel 1205 implements a frame format that comprises one or more framing bits, a first packet label that precedes a packet data, and a second packet label that follows the packet data. Surrounding a packet data with packet labels advantageously allows for relatively simple error checking at a destination associated with each wavelength channel 1205; however this format is not required. In this example, each wavelength channel 1205 implements a Generalized Multi-Protocol Label Swapping (GMPLS) routing protocol within the first and second packet labels. Although this example implements a GMPLS routing protocol, other routing protocols or data formats may be used without departing from the scope of the present disclosure.

In an embodiment, input interface 1206 is configured to receive and process each wavelength channel 1205 associated with optical signal 1203. Input interface 1206 can comprise any optical and/or electrical components—including any hardware, software, and/or firmware—capable of processing, converting, replicating, updating, and/or swapping one or more packet labels associated with each wavelength channel 1205. In various embodiments, input interface 1206 can determine a desired routing for a packet data associated with each wavelength channel 1205 and can update a first and/or second packet label using an all-optical label swapping technique. The phrase "all-optical" refers to the performance of a desired functionality substantially free from optical-to-electrical or electrical-to-optical conversions. The "all-optical" functionality does not prohibit optical-to-electrical or electrical-to-optical conversions for use by control circuitry that contributes to the overall function of the device. For example, input interface 1206 may include a controller that receives an electrical representation of a packet label and generates a control signal that functions to modulate a swapping sequence on an optical signal.

Switching element 1208 is configured to process one or more packet data associated with wavelength channels 1205 received from input interface 1206 and directing those packet data to a desired destination. Switching element 1208 can include any optical and/or electrical components— including any hardware, software, and/or firmware—capable of switching, routing, error checking, and/or managing the one or more packet data or packet labels associated with each wavelength channel 1205. In an embodiment, the switching element 1208 includes one or more processors configured to execute instructions. In an embodiment, one or more of the processors are digital signal processors (DSPs). In an embodiment, the switching element 1208 includes memory and/or a storage device that are configured to store data and/or instructions to be executed by the processor. In an embodiment, the switching element 1208 includes photonic chips. In an embodiment, switching element 1208 can comprise a ring configuration having one or more core router nodes and at least one management node. Although this example implements a ring configuration, switching element 1208 could implement a mesh configuration, a star configuration, or any other configuration without departing from the scope of the present disclosure. In various embodiments, switching element 1208 can operate to process wavelength channels 1205 at processing speeds of, for example, at least 10 gigabits/second (Gb/s), at least 40 Gb/s, at least 100 Gb/s, or at least 160 Gb/s.

In an embodiment, switching element 1208 is configured to route one or more packet data associated with wavelength channels 1205 to an output interface 1210. Output interface 1210 can comprise any optical and/or electrical components including any hardware, software, and/or firmware capable of preparing one or more packet data associated with wavelength channels 1205 for communication from router 1200. In an embodiment, the switching element 1208 includes one or more processors. In an embodiment, the processors include digital signal processors (DSPs). In an embodiment, the switching element 1208 includes photonic integrated chips. In this example, output interface 1210 operates to communicate the one or more packet data from router 1200 to a desired destination through an appropriate wavelength channel 1213.

In an embodiment, each combiner 1214 is configured to combine output wavelength channels 1213 into one or more output optical signals 1215 for communication over a communication links 1216. In an embodiment, combiner 1214 includes, for example, a wavelength division multiplexer. The structure and function of communication link 1216 can be substantially similar to the structure and function of communication link 1202. In this example, communication links 1216 operate to couple router 1200 to other optical and/or electro-optical components.

In this example, the controller 1212 is also capable of at least partially contributing to controlling one or more functionalities associated with router 1200. That is, controller 1212 is not required to be capable of performing the desired functionality alone, but may contribute to the performance of the function as part of a larger routine. Controller 1212 can comprise any communication and/or computational device or devices, including any hardware, software, firmware, or combination thereof.

In an embodiment, in operation, the packet data associated with wavelength channels 1205 are transparent to the processing functions of router 1200. That is, in operation router 1200 does not examine the content of the packet data associated with each wavelength channel 1205. In some cases, router 1200 does examine the contents of one or more packet labels and/or other elements of a frame format associated with wavelength channels 1205. In most cases, router 1200 operates to maintain the packet data associated with wavelength channels 1205 in the optical domain. That is, the packet data associated with each wavelength channel 1205 are not subjected to an optical-to-electrical conversion by router 1200. In some cases, one or more of the packet labels and/or other elements of a frame format associated with wavelength channels 1205 can be subjected to one or more optical-to-electrical and/or electrical-to-optical conversions. In various embodiments, router 1200 may be capable of an aggregate capacity of, for example, at least 5 terabits/second (Tb/s), at least 25 Tb/s, at least 50 Tb/s, or at least 100 Tb/s.

In an embodiment, router 1200 can operate to minimize and/or avoid contention between packet data associated with optical signals 1203 and 1215 and/or wavelength channels 1205 and 1213 within switching element 1208 and/or communication links 1202 and 1216. The term "contention" as used herein refers to a process by which a packet data competes with other packet data for communication over a specific wavelength. In some cases, contention can be minimized by, for example, implementing a ring network architecture or performing wavelength conversion. Minimizing and/or avoiding contention can result in a reduction in the congestion associated with an optical signal wavelength.

The disclosed systems, methods, and apparatuses for optical bridge crossings may be applied both to single optical on-chip applications as well as optical chip-to-chip connections.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A system for transmitting an optical signal across an optical obstruction, comprising:
    a first optical waveguide optically coupled to a first surface grating coupler (SGC);
    a second optical waveguide optically coupled to a second SGC, the second optical waveguide being a separate waveguide from the first optical waveguide; and
    a reflector configured to reflect an optical signal for free-space propagation from the first SGC to the second SGC without an optical waveguide between the reflector and the first SGC and without an optical waveguide between the reflector and the second SGC, a reflecting surface of the reflector being parallel to a direction of propagation of the optical signal through the first optical waveguide and to a direction of propagation of the optical signal through the second optical waveguide.

2. The system of claim 1, wherein the reflector comprises a specular reflector.

3. The system of claim 2, wherein the specular reflector comprises a diffraction grating.

4. The system of claim 1, wherein the reflector comprises a metal mirror.

5. The system of claim 1, wherein the reflector comprises a dielectric interference filter.

6. The system of claim 1, wherein the first SGC is disposed on a first substrate and the second SGC is disposed on a second substrate.

7. The system of claim 6, wherein one of the first substrate and the second substrate comprises silicon-on-insulator.

8. The system of claim 6, wherein one of the first substrate and the second substrate comprises a compound semiconductor.

9. The system of claim 1, further comprising at least one support member supporting the reflector.

10. The system of claim 9, wherein the support member comprises a copper pillar.

11. The system of claim 9, wherein the support member comprises a cement.

12. The system of claim 11, wherein the cement comprises an epoxy.

13. The system of claim 1, wherein the reflector comprises a broadband mirror.

14. The system of claim 1, wherein the reflector comprises a wavelength selective mirror.

15. The system of claim 1, wherein the first optical waveguide optically coupled to a first surface grating coupler (SGC) is in a first optical chip and the second optical waveguide optically coupled to a second SGC is in a second optical chip.

16. A network component configured for transmitting and receiving optical signals, the network component comprising:
    a photonic integrated circuit (PIC), wherein the PIC comprises:
    a first optical waveguide optically coupled to a first surface grating coupler (SGC);
    a second optical waveguide optically coupled to a second SGC, the second optical waveguide being a separate waveguide from the first optical waveguide; and
    a reflector configured to reflect an optical signal for free-space propagation from the first SGC to the second SGC without an optical waveguide between the reflector and the first SGC and without an optical waveguide between the reflector and the second SGC, a reflecting surface of the reflector being parallel to a direction of propagation of the optical signal through the first optical waveguide and to a direction of propagation of the optical signal through the second optical waveguide.

17. The network component of claim 16, wherein the reflector comprises a specular reflector.

18. The network component of claim 16, wherein the reflector comprises a metal mirror.

19. The network component of claim 16, wherein the reflector comprises a dielectric interference filter.

20. The network component of claim 16, wherein the first SGC is disposed on a first substrate and the second SGC is disposed on a second substrate.

21. The network component of claim 20, wherein the one of the first substrate and the second substrate comprises silicon-on-insulator.

22. The network component of claim 20, wherein the one of the first substrate and the second substrate comprises a compound semiconductor.

23. The network component of claim 16, wherein the reflector reflects the optical signal across an optical obstruction separating the first optical waveguide from the second optical waveguide.

24. The network component of claim 16, wherein the PIC comprises a first PIC and a second PIC and wherein the first PIC comprises the first optical waveguide and the second PIC comprises the second optical waveguide.

25. A method for transmitting an optical signal across an optical obstruction in an photonic integrated circuit (PIC), comprising:
    propagating an optical signal through a first optical waveguide to a first surface grating coupler (SGC) optically coupled to the first optical waveguide;
    reflecting with a reflector the optical signal received from the first SGC to a second SGC, the optical signal propagating in free space from the reflector to the second SGC without an optical waveguide between the reflector and the first SGC and without an optical waveguide between the reflector and the second SGC; and
    propagating the optical signal received at the second SGC through a second optical waveguide optically coupled to the second SGC, the second optical waveguide being a separate waveguide from the first optical waveguide, and a reflecting surface of the reflector being parallel to a direction of propagation of the optical signal through the first optical waveguide and to a direction of propagation of the optical signal through the second optical waveguide.

26. The method of claim 25, further comprising deflecting, with the first SGC, the optical signal out of a plane of propagation toward the reflector before the optical signal reaches an optical barrier separating the first optical waveguide from the second optical waveguide.

27. The method of claim 26, wherein the reflector is situated out of a plane defined by the first SGC, the second SGC, and the optical barrier.

28. The method of claim 26, wherein the optical barrier comprises one of a gap, a waveguide, and a deep isolation trench.

29. The method of claim 25, wherein propagating the optical signal received at the second SGC through the second optical waveguide comprises collecting the reflected optical signal at the second SGC and focusing the collected signal onto the second optical waveguide.

30. The method of claim 25, wherein the reflector comprises one of a dielectric and a metal.

31. The method of claim 25, wherein the reflector comprises a broadband mirror.

32. The method of claim 25, wherein the reflector comprises a wavelength selective mirror.

* * * * *